(12) United States Patent
von Trepka

(10) Patent No.: US 6,227,765 B1
(45) Date of Patent: May 8, 2001

(54) PIPELINE DEVICE, A TOOL FOR THE GUIDE-IN OF A PIPELINE END AND A METHOD FOR THE PULL-IN OF A PIPELINE END

(75) Inventor: Knut von Trepka, Oslo (NO)

(73) Assignee: Kvaerner Oilfield Products A.S., Oslo (NO)

( * ) Notice: Subject to any disclaimer, the term of this patent is extended or adjusted under 35 U.S.C. 154(b) by 0 days.

(21) Appl. No.: 09/186,694

(22) Filed: Nov. 6, 1998

(51) Int. Cl.[7] ................................. E21B 41/04; F16L 1/16
(52) U.S. Cl. ......................... 405/170; 166/343; 166/349
(58) Field of Search ................................... 405/170, 169, 405/171, 154; 166/342, 343, 349, 347

(56) References Cited

U.S. PATENT DOCUMENTS

| | | | |
|---|---|---|---|
| 375,464 | * 12/1887 | Thacher et al. | 405/170 |
| 3,578,233 | * 5/1971 | Meister | 405/170 X |
| 3,711,938 | * 1/1973 | Warren et al. | 405/170 X |
| 3,795,115 | * 3/1974 | Berquist et al. | 405/170 |
| 3,931,670 | * 1/1976 | Berquist et al. | 405/170 X |
| 4,028,903 | * 6/1977 | Dietrich | 405/170 |
| 4,039,087 | * 8/1977 | Sandvick | 405/170 X |
| 4,076,130 | * 2/1978 | Sumner | 405/170 |
| 4,091,514 | * 5/1978 | Motes-Conners et al. | 405/170 X |
| 4,161,367 | * 7/1979 | Cuiper et al. | 166/343 X |
| 4,436,449 | 3/1984 | Smoot et al. . | |
| 4,832,530 | * 5/1989 | Andersen et al. | 405/170 |
| 5,501,549 | * 3/1996 | Breda et al. | 166/347 X |
| 5,593,249 | * 1/1997 | Cox et al. | 405/191 |
| 5,947,642 | * 9/1999 | Teixeir et al. | 405/195 |
| 6,024,514 | * 2/2000 | Ostergaard | 405/170 |

FOREIGN PATENT DOCUMENTS

| | | | |
|---|---|---|---|
| 2408978 | * 8/1975 | (DE) | 405/170 |
| 1 595 993 | 8/1981 | (GB) . | |
| 2 335 961 | 10/1999 | (GB) . | |

* cited by examiner

Primary Examiner—Eileen D. Lillis
Assistant Examiner—Tara L. Mayo
(74) Attorney, Agent, or Firm—Young & Thompson

(57) ABSTRACT

A pipeline (23) device, comprising at least one end for connection to a connection site, e.g., on another pipeline (22), on the seabed. A sleeve, movable in the longitudinal direction of the pipeline (23), is arranged at the end of the pipeline (23). A pull-in device (4, 36, 39) grips the sleeve (29) in order to pull the end of the pipeline (23) towards the connection site. The sleeve (29) may be arranged rotatably on the pipeline, and the pipeline may comprise a conical portion (26) into which the sleeve (29) is adapted to enter in order to center the pipeline (23) end relative to the sleeve (29).

11 Claims, 8 Drawing Sheets

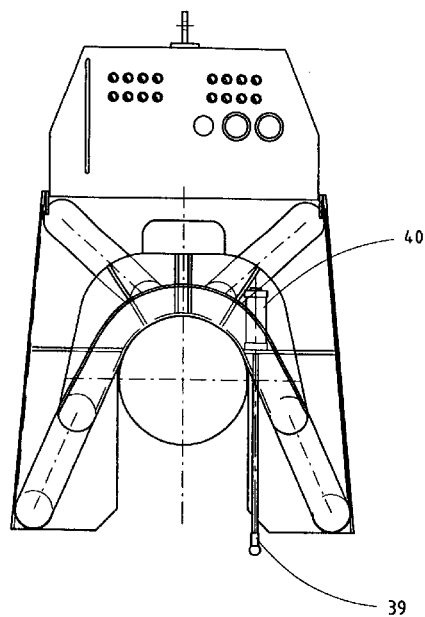
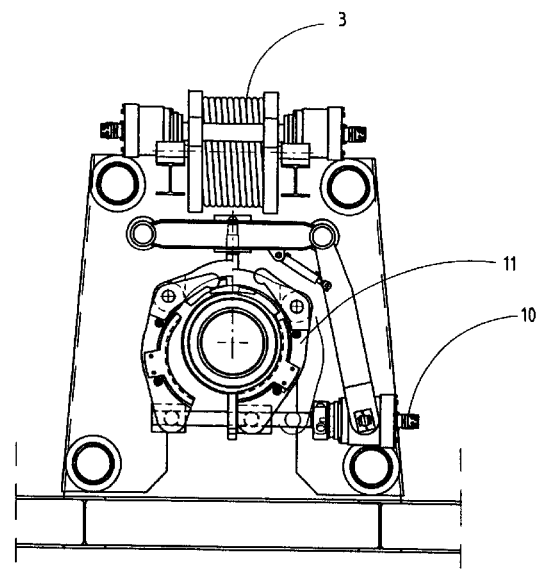
Fig. 4    Fig. 5
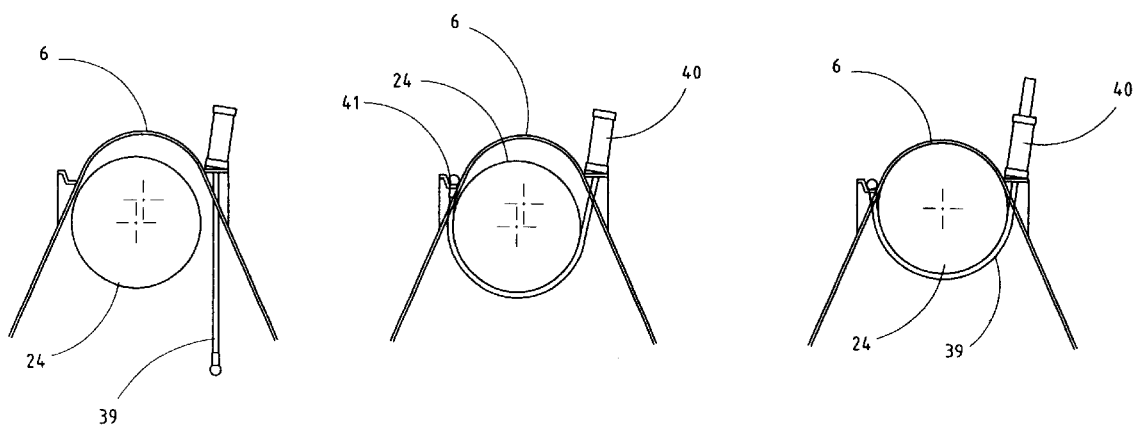
Fig. 6    Fig. 7    Fig. 8

PIPELINE DEVICE, A TOOL FOR THE GUIDE-IN OF A PIPELINE END AND A METHOD FOR THE PULL-IN OF A PIPELINE END

FIELD OF THE INVENTION

The present application relates to equipment and methods for connecting pipeline sections on the seabed, or to be more precise, a pipeline device, a tool, and a method.

SUMMARY OF THE INVENTION

One of the objects of the present invention is to reduce the weight and size of the equipment used to connect and disconnect pipeline sections on the seabed.

Another object of the present invention is to make the equipment used during the connection cheaper and simpler.

A further object of the present invention is to make the procedure for connection and disconnection of pipeline sections simpler and faster.

As will be understood after a perusal of the following description, the aforementioned and other advantages are achieved according to the invention.

BRIEF DESCRIPTION OF THE DRAWING

The present invention will now be explained in more detail with reference to the accompanying figures, wherein:

FIG. 4 shows the guide-in and tie-in tool according to FIG. 1 seen in the direction of the arrow B in FIG. 1;

FIG. 5 is a sectional view along the line V—V in FIG. 1 seen in the direction of the arrow B;

FIGS. 6, 7 and 8 show the pull-in of the pipe termination with the aid of a sling-like wire, in section and in three steps;

DETAILED DESCRIPTION OF THE INVENTION

Figure 1:
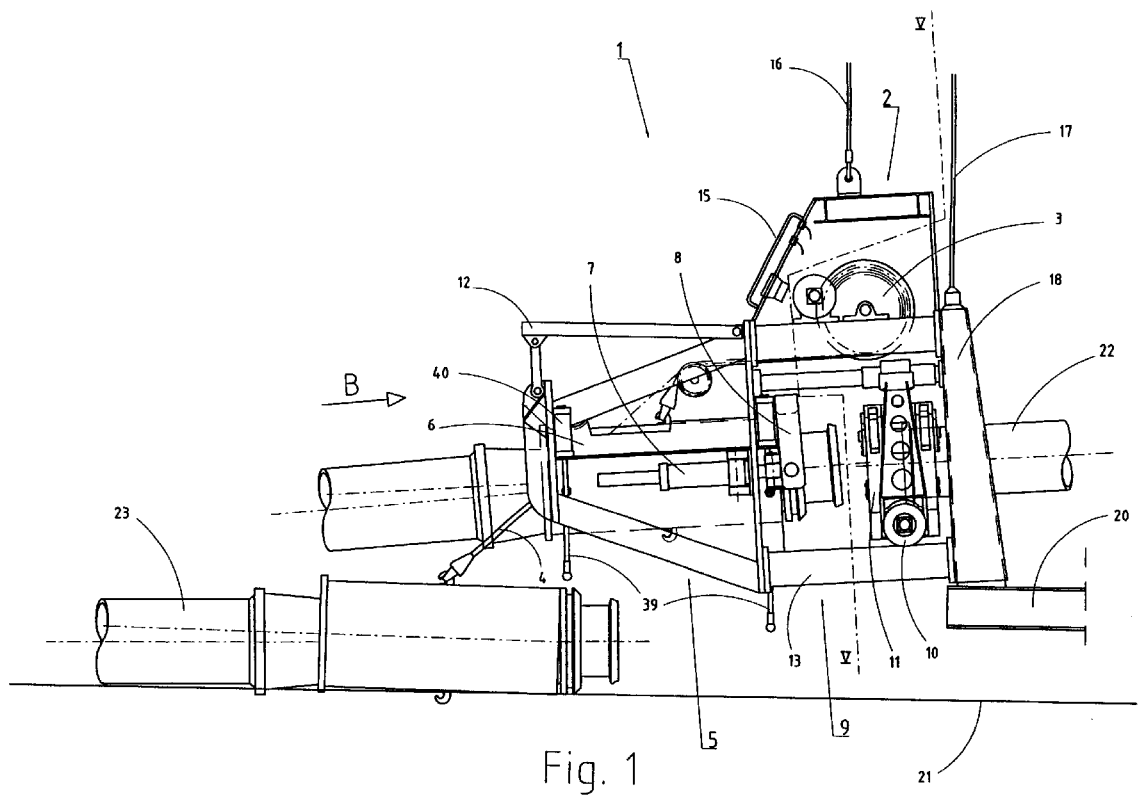
FIG. 1 shows an embodiment of a pull-in, guide-in and tie-in/connection tool according to the invention.

FIG. 1 shows a pull-in, guide-in and tie-in tool 1 according to the invention (hereinafter called the tool). It consists in general of a pull-in unit 2, comprising a pull-in winch 3 and a pull-in wire 4, a guide-in unit 5 comprising a guide-in tunnel 6, one or more guide-in cylinders 7 and a guide-in shoe 8, and a tie-in unit 9, which includes inter alia a torque tool 10 for affixing a connector 11.

FIGS. 4 and 5 show the guide-in and tie-in tool 1 according to the invention seen respectively from the end in the direction of the arrow B in FIG. 1 and in a section along the line V—V in FIG. 1, also in the direction of the arrow B. The tool 1 also comprises a frame 12 for the guide-in unit and a frame 13 for the tie-in unit 9. The frame 12 is equipped with a platform on which to land a ROV, and close to the platform there is arranged a ROV panel 15, from where a ROV (not shown) can operate the tool 1. The whole tool 1 can be lowered down from a service vessel (not shown) with the aid of a lifting wire 16 and in part be guided with the aid of a guide wire 17 and/or the ROV.

The tool 1 also comprises guide sleeves 18, which can be passed down over conical stabbing guides (19) (see FIG. 12) on a platform 20 on the seabed 21.

The platform 20 forms a foundation for a pipe end 22, which is to be connected to another pipe end 23, equipped with a pipe termination 24. In FIG. 1 the pipe termination 24 is shown in two positions, a first position lying on the seabed 21 and a second position pulled into the guide-in tunnel 6.

Figure 2:
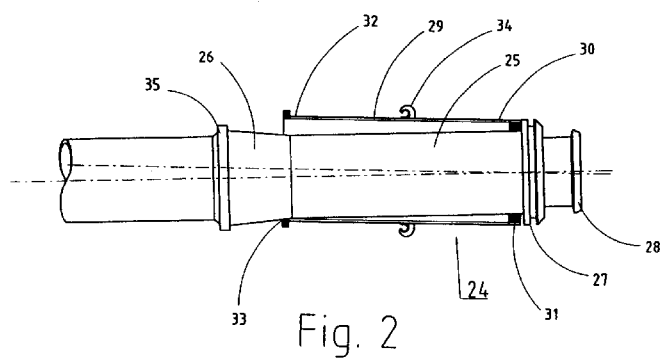
FIG. 2 shows a detail of the pipe termination according to the invention with the movable sleeve in a pull-in position.
Figure 3:
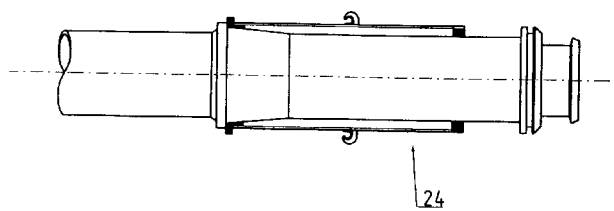
FIG. 3 shows a detail of the pipe termination according to the invention with the movable sleeve in a connection position.

In FIGS. 2 and 3 the pipe termination 24 is shown in more detail. It comprises a pipe section 25 equipped with a guide-in cone 26 and a guide-in collar 27. At the outermost end of the pipe section there is also arranged a connection flange 28. Around the pipe section 25 there is arranged a movable guide-in sleeve 29, which at its outer end 30 is equipped with an internal ring 31, whose internal diameter is adapted to the outer diameter of the pipe section 25. At its inner end 32 the sleeve 29 is equipped with an internal ring 33, whose internal diameter corresponds to the diameter at a point on the cone 26. About halfway along the movable sleeve 29 there is arranged a hook 34. The diameter of the rings 31 and 32 are adapted to the diameter of the pipe section 25 so as to enable the sleeve 29 to rotate freely on the pipe section 25. The cone 26 is equipped with a stop collar 35, which restricts the movement of the sleeve 29 towards the cone 26, whilst the movement of the sleeve 29 towards the outer end of the pipe termination is restricted by the guide-in collar 27.

The sleeve 29 does not necessarily need to be made in the shape of a circular cylinder. It may also conceivably be a single ring, consist of several interconnected rings or be made in the form of a slide which is movable in a groove on the pipe termination 24. For the sake of simplicity, hereinafter this element is referred to as sleeve.

A first procedure for use of the tool according to the invention will now be explained with reference to FIGS. 9–12, where the tool 1 is to form a connection between two pipeline sections 22 and 23.

Figure 9:
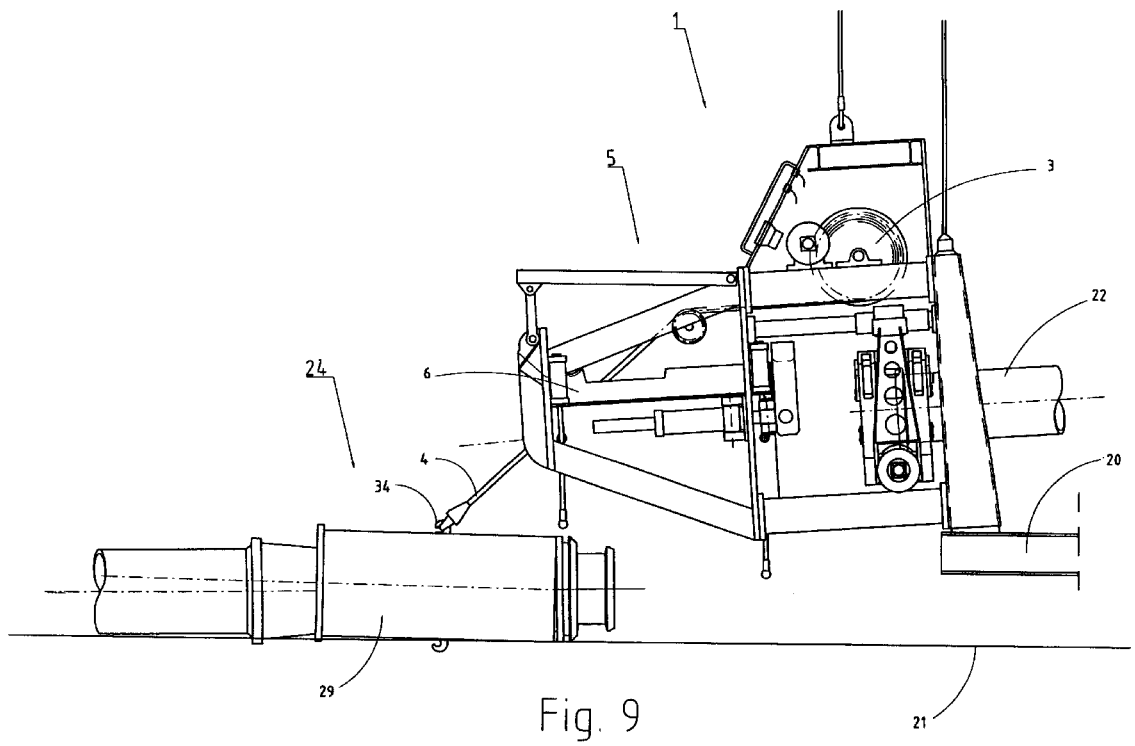
FIG. 9 shows a first step in the pull-in of a pipe termination wherein the pipe termination is a relatively short distance from the connector.

In FIG. 9 the pipe termination 24 is lying on the seabed 21 at a relatively short distance from the pipe end 22. The guide-in and tie-in tool 1 according to the invention is first lowered down to the platform 20 and positioned with the aid of the conical stabbing guides 19. A ROV (not shown) pulls an outer end of the pull-in wire 4 down to the hook 34 on the sleeve 29. The winch 3 is then set in rotation and pulls in the wire 4 so that the pipe termination 24 is pulled in towards the guide-in unit 5. At the same time the sleeve 29 is urged towards the guide-in collar 27.

Figure 10:
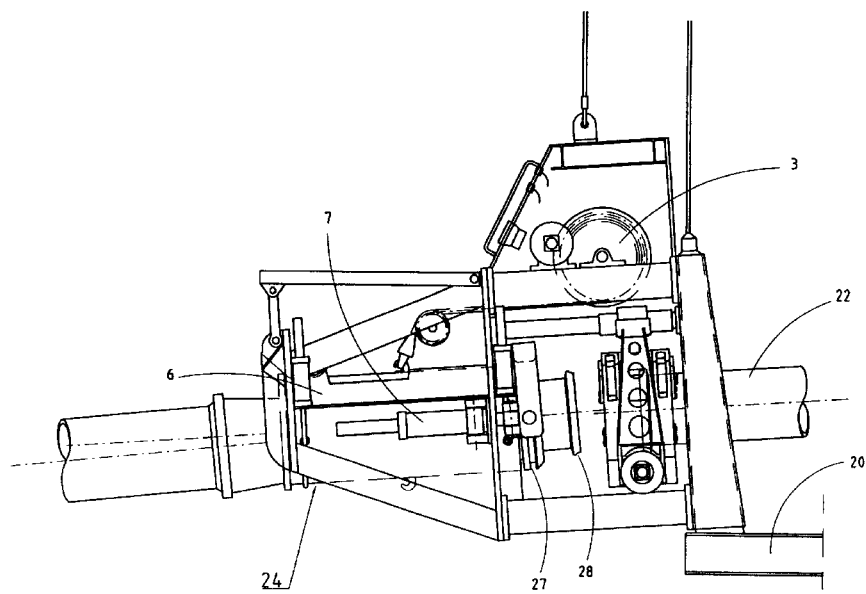
FIG. 10 shows the securing of the pipe termination in the guide-in tunnel.

When the pipe termination 24 has reached the position shown in FIG. 10, where it is right inside the guide-in tunnel 6, the winch 3 is stopped. The sleeve 29 is now pushed right against the guide-in collar 27. The sleeve 29 is now retained in the guide-in tunnel 6, whilst the guide-in shoe 8 grips the guide-in collar 27. The guide-in cylinders 7 are now set in motion and push the guide-in shoe 8 towards the pipe end 22 until the flange 27 is inside the connector 11. During the guide-in, the cone 26, in interaction with the guide-in shoe 8, will help to align the termination 24 correctly relative to the connector 11 so that the centre line of the termination 24 is in alignment with the centre line of the connector 11. The winch 3 thus need not take up great aligning forces, as these are taken up by the guide-in tunnel 6, the guide-in shoe 8 and the guide-in cylinders 7.

Figure 11:
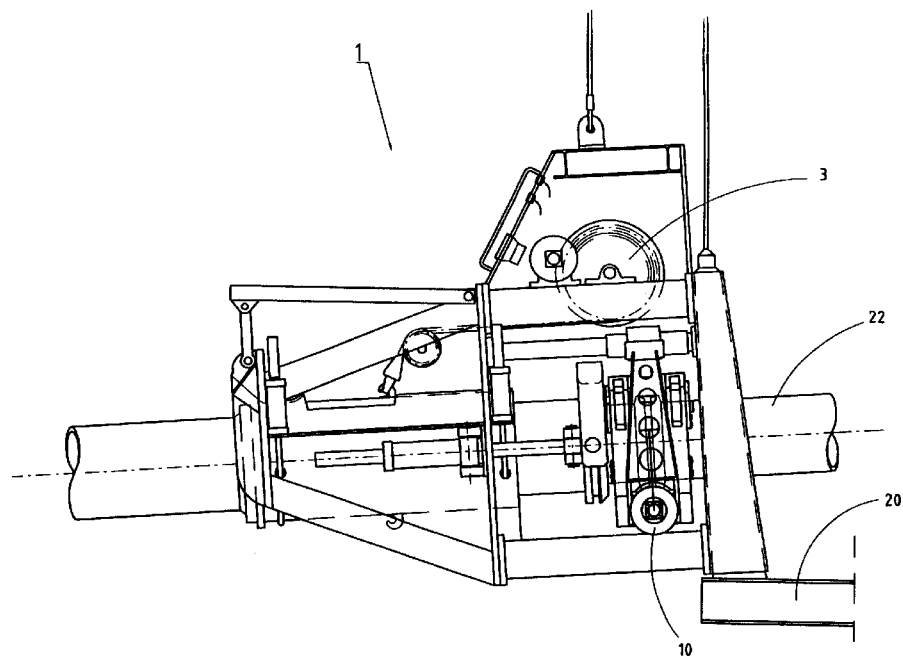
FIG. 11 shows the guide-in and alignment of the pipe termination relative to the connector.

In FIG. 11 the flange 28 has been pushed right inside the connector 11 and the guide-in cylinders 7 are stopped. Now the connector torque tool 10 in the tie-in unit 2 comes into function and in a conventional manner tightens the connector around the flange 28 and the corresponding flange (not shown) on the pipe end 22.

Figure 12:
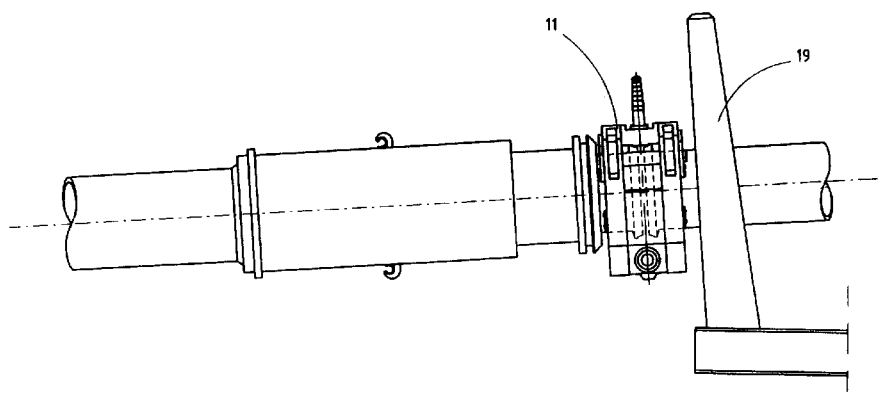
FIG. 12 shows the pipe termination fully connected to the connector.

The tool 1 is then released from the pipeline and the connection is complete, as shown in FIG. 12.

Figure 14:
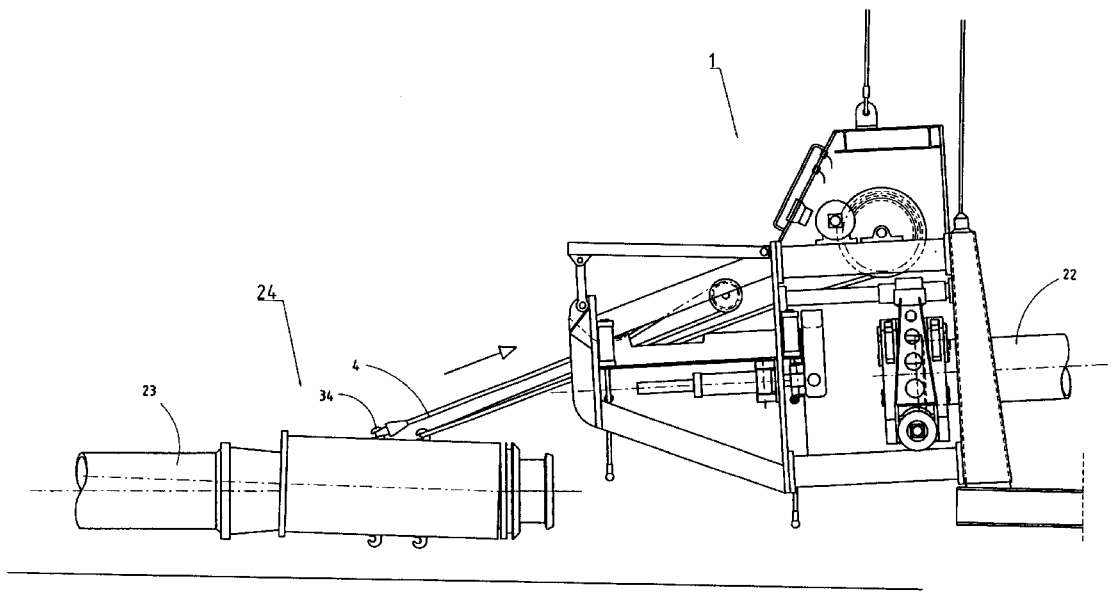
FIG. 14 shows the pull-in of the pipe termination with hoist connection.
Figure 15:
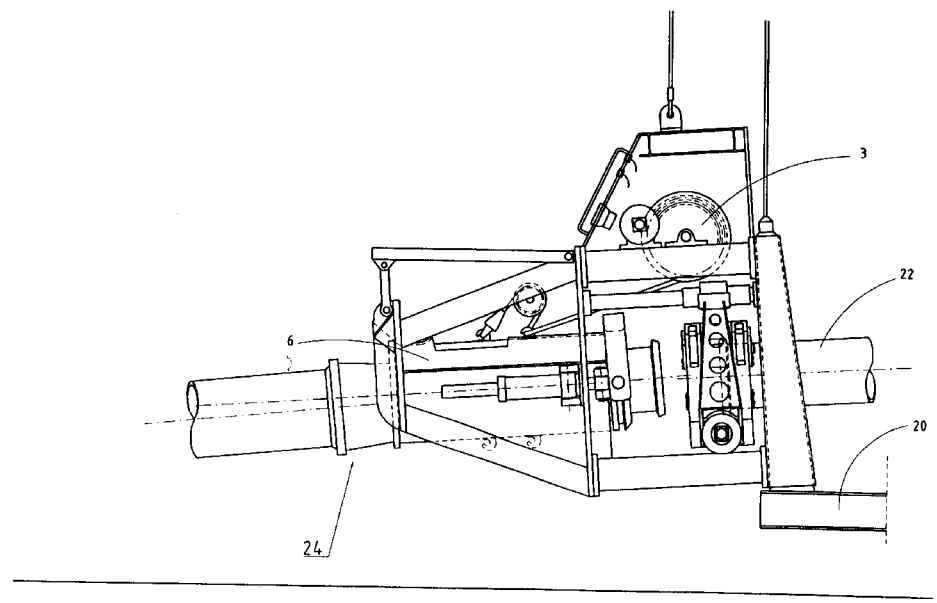
FIG. 15 shows the securing of the pipe termination to the guide-in tunnel.

A second procedure for forming a connection between two pipeline sections 22, 23 will now be explained with reference to FIGS. 13–15.

Figure 13:
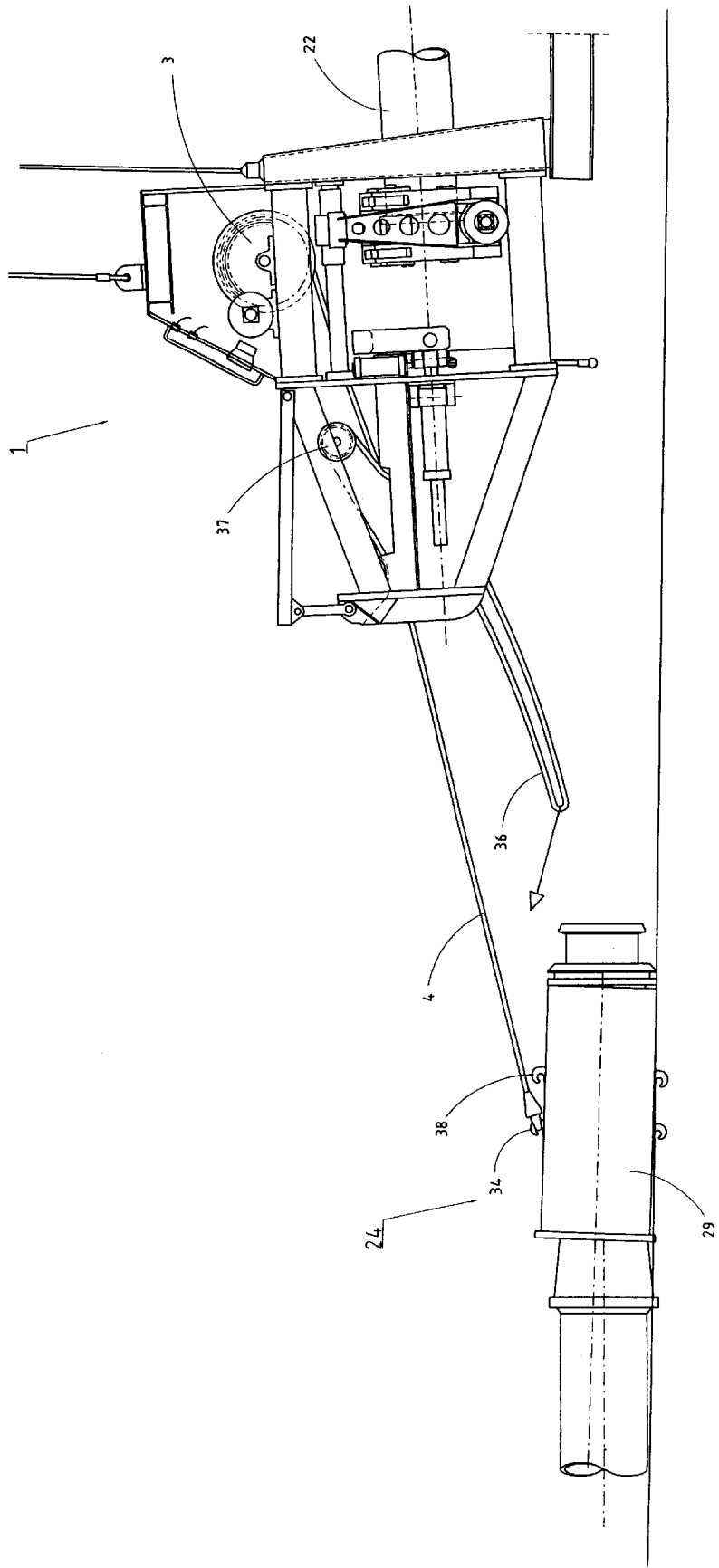
FIG. 13 shows the pull-in of the pipe termination when this is at a relatively long distance from the connector.

In FIG. 13 the pipe termination 24 is at a greater distance from the pipe end 22. This also means that there may be a greater deviation between the centre line of the pipe termination 24 and the centre line of the pipe end 22. A ROV will first pull the wire 4 to the hook 34 on the sleeve 29, in the same way as explained above in connection with FIGS. 9–12. A ROV is then guided to grip a section 36 of the wire 4 which is between the winch 3 and a guiding sheave 37. The section 36 is pulled towards a second hook 38 on the sleeve 29. The winch 3 is thus provided with triple pull-in force, as now two pulling cables are formed between the pipe termination 24 and the guide-in and tie-in tool 1, in the same way as with a hoist (see FIG. 14). Now the winch is set in rotation and, as described above, pulls the pipe termination 24 towards the pipe end 22 with increased pull-in force. In this way even large deviations between the centre line of the termination 24 and the centre line of the connector 11 can be overcome using a relatively weak winch. This arrangement of the wire 4 can be maintained right up until the pipe termination 24 has been pulled inside the tunnel 6 (see FIG. 15). The further progression is as described under FIGS. 11 and 12.

Figure 16:
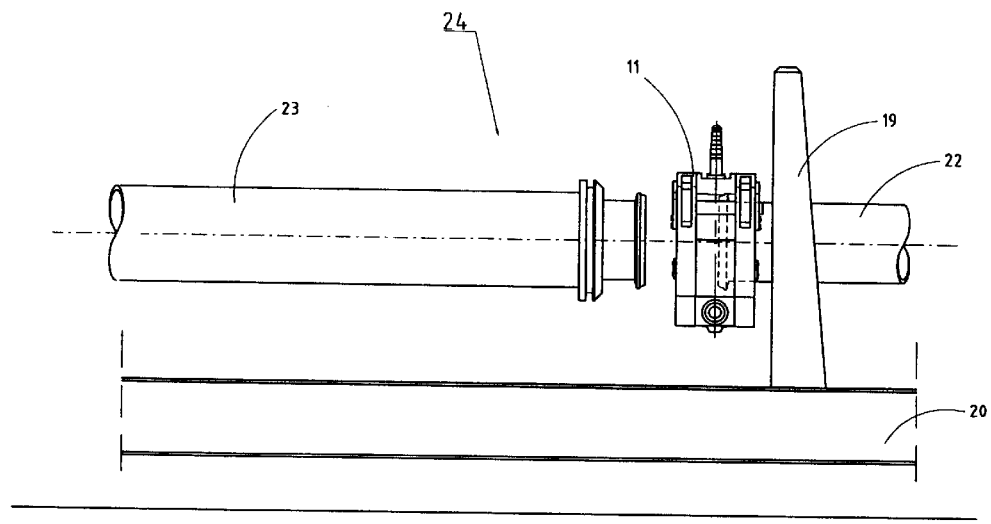
FIG. 16 shows an instance where the pipe termination is at a very small distance from the connector and where the centre line of the pipe termination is in alignment with the centre line of the connector.
Figure 17:
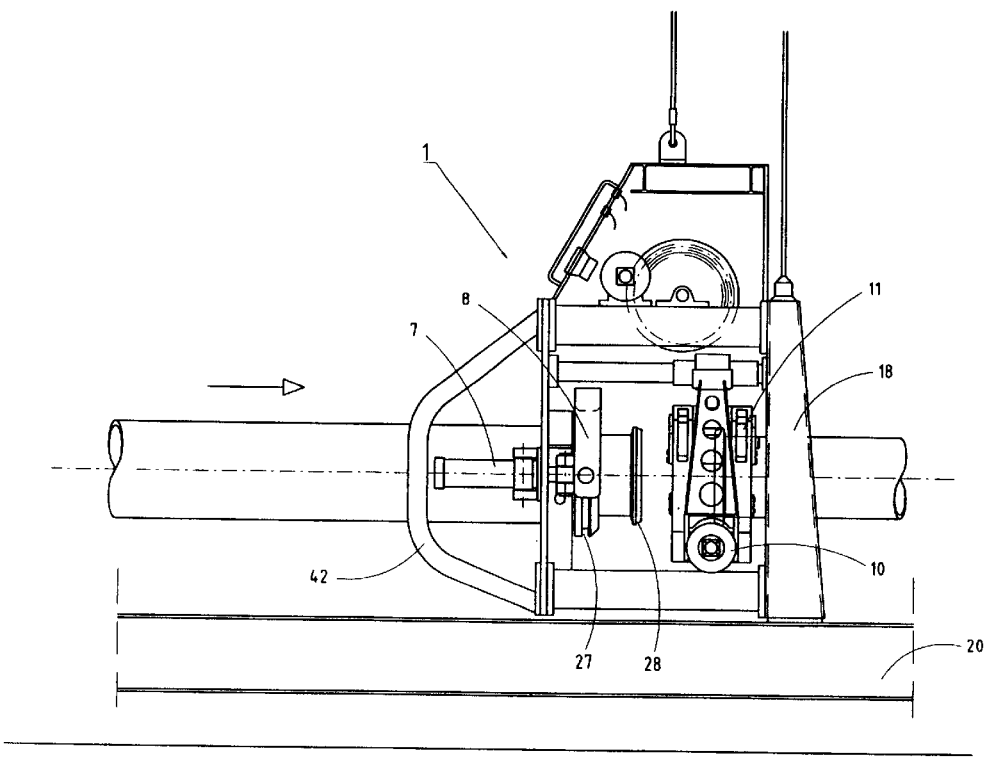
FIG. 17 shows the tie-in unit in use together with a simplified guide-in unit but without the use of the pull-in unit.

A third procedure for tie-in of a connection between two pipe line sections is shown in FIGS. 16–17. This procedure is used for an intermodular connection, where the pipeline sections are at a very small distance from one another.

FIG. 16 shows a situation where the pipe termination 24 is at a very small distance from the connector 11. In this case no movable sleeve 29 is arranged on the pipe termination 24, but it may be present without having any appreciable effect on the procedure. The situation shown in FIG. 16 may exist, e.g., when a valve in the pipeline is to be removed and replaced with a new one. In this case there is no need for the pull-in unit and a simpler version of the guide-in unit can be used, which does not comprise a guide-in tunnel, but does comprise guide-in shoe 8 and guide-in cylinders 7. The frame 5 can therefore be removed and optionally replaced by a smaller and lighter frame 42. Nor is the winch 3 required for an intermodular connection of this kind, and may optionally also be removed.

In FIG. 17 the remaining tie-in unit is lowered into place for connection of the pipeline. The guide-in shoe 8 then grips the collar 27 and the guide-in cylinders 7 are actuated to guide the flange 28 into the connector 11, as shown in FIG. 18.

Figure 19:
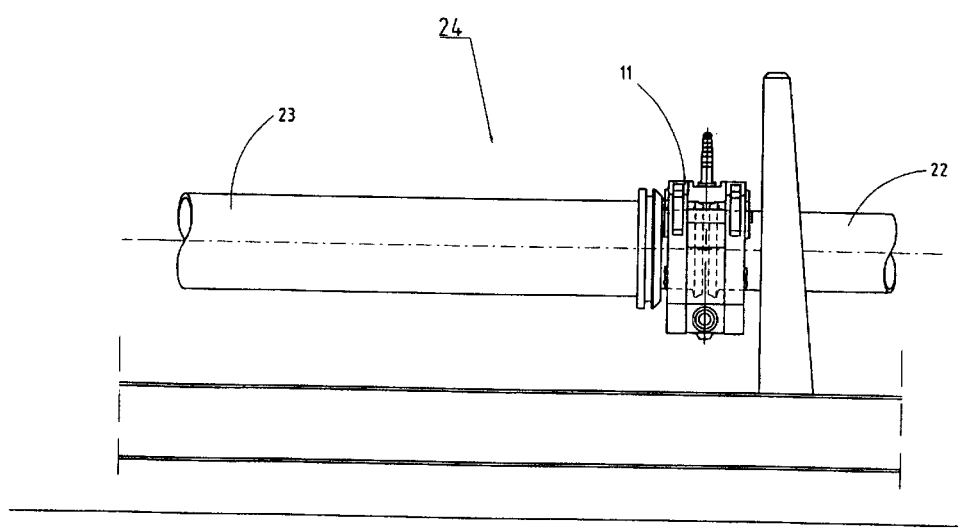
FIG. 19 shows a completed connection.

FIG. 19 shows the completed connection.

Figure 18:
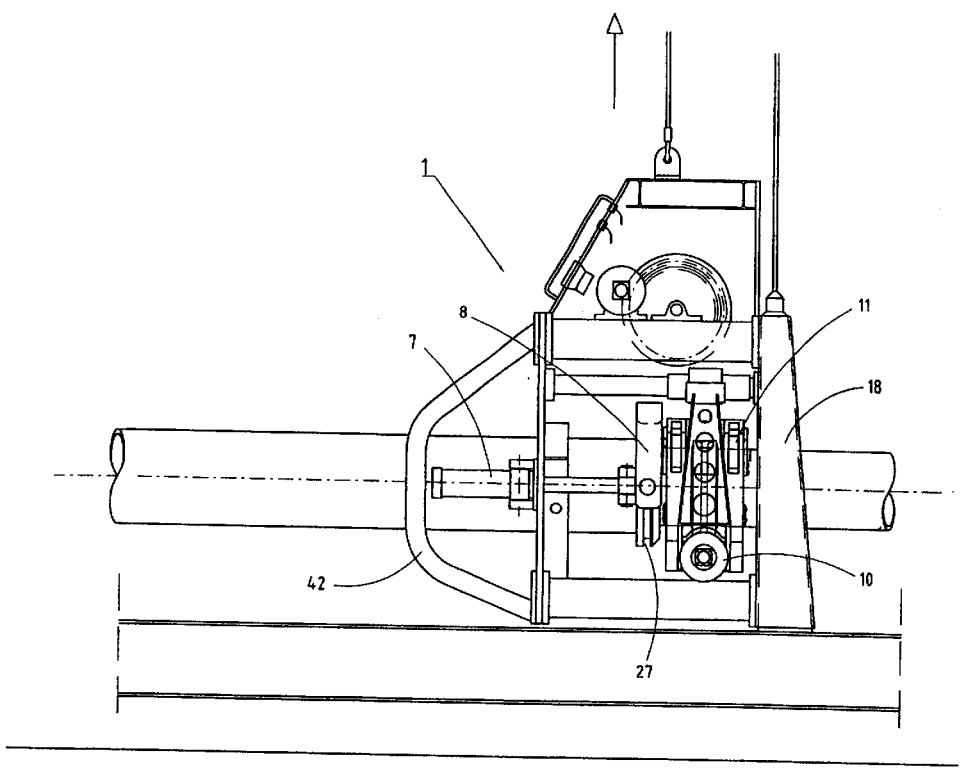
FIG. 18 shows connection with the aid of the unit according to FIG. 17.

The tool according to FIGS. 17 and 18 may also be used to disconnect pipeline sections from one another. In such a case the tool 1 is lowered into place on the platform 20, the connector torque tool 10 opens the connector 11 and the guide-in shoe 8 grips the guide-in collar 27, whereupon the guide-in cylinders 7 are actuated in order to pull the guide-in shoe 8 and guide-in collar 27 away from the connector 11.

The tool 1 according to FIGS. 17 and 18 can be used in a fourth tie-in procedure, which can be used especially when laying a new pipeline, where a situation exists wherein a pipeline section, which may be an already existing pipeline 22, is on the seabed, and a second pipeline section 23, including its termination 24, which is to be connected to the pipeline section 22 on the seabed, is at the surface, e.g., on board a pipe laying vessel (not shown).

According to this procedure, the tool 1 is affixed to the pipe termination 24 whilst still at the surface, e.g., whilst the pipe termination 24 is on board the vessel. The guide-in shoe grips the guide-in collar so that the pipe termination 24 and the tool 1 can be lowered together to the seabed. Here the tool 1 is lowered with its guide sleeves 18 over the conical stabbing guides 19 of the platform 20. Thus, the situation according to FIG. 17 will be reached and the connection can take place in the same way as mentioned above in connection with FIGS. 17–19.

According to this procedure, the connector 11 may already be on the pipeline section 22 at the seabed or is carried down whilst retained by the tool 11.

In the aforementioned procedure the laying of a new pipeline can take place at a substantially higher speed. Today, the termination of a new pipeline would have to be laid at a reasonable distance from the pipeline section to which it is to be connected. The tie-in tool must then be lowered and a ROV must make the connection between the tool and the pipe termination. This also involves a search operation for the ROV, which must find the pipe termination. After the connection between the tool and the pipe termination has been made, the pull-in and alignment can begin. With the aforementioned procedure and the aforementioned tool according to the invention, several of these steps can be omitted. The connection may therefore take place considerably faster and without any need for a separate tool for lowering the pipe termination to the seabed.

FIGS. 6, 7 and 8 show another pull-in device which can be used if it is not possible to pull the pipe termination 24 all the way inside the guide-in tunnel 6 with the aid of the winch 3. FIGS. 1 and 4 show two so-called sling wires 39 which are connected at one end thereof to a sling cylinder 40. FIGS. 6, 7 and 8 show this more clearly in a section. In FIG. 6 the pipe termination 24 has been pulled almost inside the guide-in tunnel 6. A ROV fetches the outer end of a sling wire 39, guides it around the pipe termination 24 and fastens it in a receiving member 41 on the opposite side of the guide-in tunnel to the sling cylinder 40, as shown in FIG. 7. The sling cylinder 40 is then actuated, as shown in FIG. 8, and the pipe termination 24 is pulled right inside the guide-in tunnel 6. Preferably, at least two sling wires are provided, but is some cases one wire may in fact be sufficient.

By means of the device according to the present invention it is possible to reduce substantially the size of the winch used. The winch need no longer take up large guide-in in forces, and can therefore be adapted so that it is merely capable of pulling the pipeline into the immediate vicinity of the guide-in tunnel. The actual guide-in and alignment of the pipe termination 24 takes place without the winch being loaded to any appreciable extent. This means that a lighter winch may be chosen. As a lighter and smaller winch is used, the whole tool can also be proportioned to be lighter and the tool is thus more manoeuvrable, requires less powerful lifting tackle and can be operated by a smaller vessel than has been possible hitherto.

With lighter and smaller tackle, the pull-in, guide-in and tie-in process can be performed more speedily and readily than with conventional connection tools.

What is claimed is:

1. A pipeline device comprising a pipeline extending in a direction of a longitudinal axis, and comprising a pipe termination; said pipeline having at least one end for connection to a connection site; said at least one end including an element movable in said direction; said element being arranged to rotate around the longitudinal axis of the pipeline; and a pull-in device operatively associated with said element, and structured and arranged to pull the end of the pipeline towards the connection site.

2. The device according to claim 1, wherein the movable element is a sleeve which encircles the pipeline at the end thereof, and is movable over a limited section between a collar close to the end of the pipeline and a stop collar at a greater distance from the end of the pipeline.

3. The device according to claim 2, wherein the pipe termination comprises a pipe section equipped with a conical portion in connection with the stop collar; the sleeve during guide-in of the end of the pipeline towards the connection site being adapted to enter the conical portion; and the end of the pipeline being thereby centered relative to the sleeve.

4. The device according to claim 2, wherein the sleeve comprises an internal ring at its end closest to the end of the pipeline, and an internal ring at its end furthest from the pipeline end.

5. The device according to claim 2, wherein the sleeve comprises at least one hook approximately in the center of its length onto which a pull-in wire can be hooked.

6. The device according to claim 5, wherein the sleeve comprises another hook onto which a loop of pull-in wire can be hooked.

7. A tool for the guide-in of a pipeline end towards a connection site, comprising a guide-in tunnel adapted to receive a sleeve positioned on the end of the pipeline so as to be longitudinally movable; and a guide-in shoe for gripping and guiding the end of the pipeline in towards the connection site while the sleeve is retained in the guide-in tunnel.

8. The tool according to claim 7, further comprising a wire attached to a winch to retain the sleeve in the tunnel.

9. The tool according to claim 7, further comprising a wire which extends from one side of a tunnel, around and under the sleeve to the other side of the tunnel to retain the sleeve.

10. A method for the pull-in of a pipeline end, and for guiding the pipeline end toward a connection site on the seabed, which comprises the steps of:

securing an outer end of a first wire attached to a winch to a hook on the end of the pipeline;

pulling the pipeline end with the winch towards a guide-in tunnel on a pull-in tool;

providing an element, movable in the longitudinal direction of the pipeline, at the end of the pipeline;

retaining said element in the guide-in tunnel;

gripping the pipeline end with a guide-in shoe; and shifting the gripped pipeline end towards the connection site, while retaining the movable element relative to the connection site.

11. The method according to claim 10, further comprising the step of centering the pipeline relative to the connection site while performing the shifting step.

* * * * *